June 25, 1929.  L. D. SOUBIER  1,718,608
GLASS FEEDING APPARATUS
Filed April 12, 1926  3 Sheets-Sheet 1
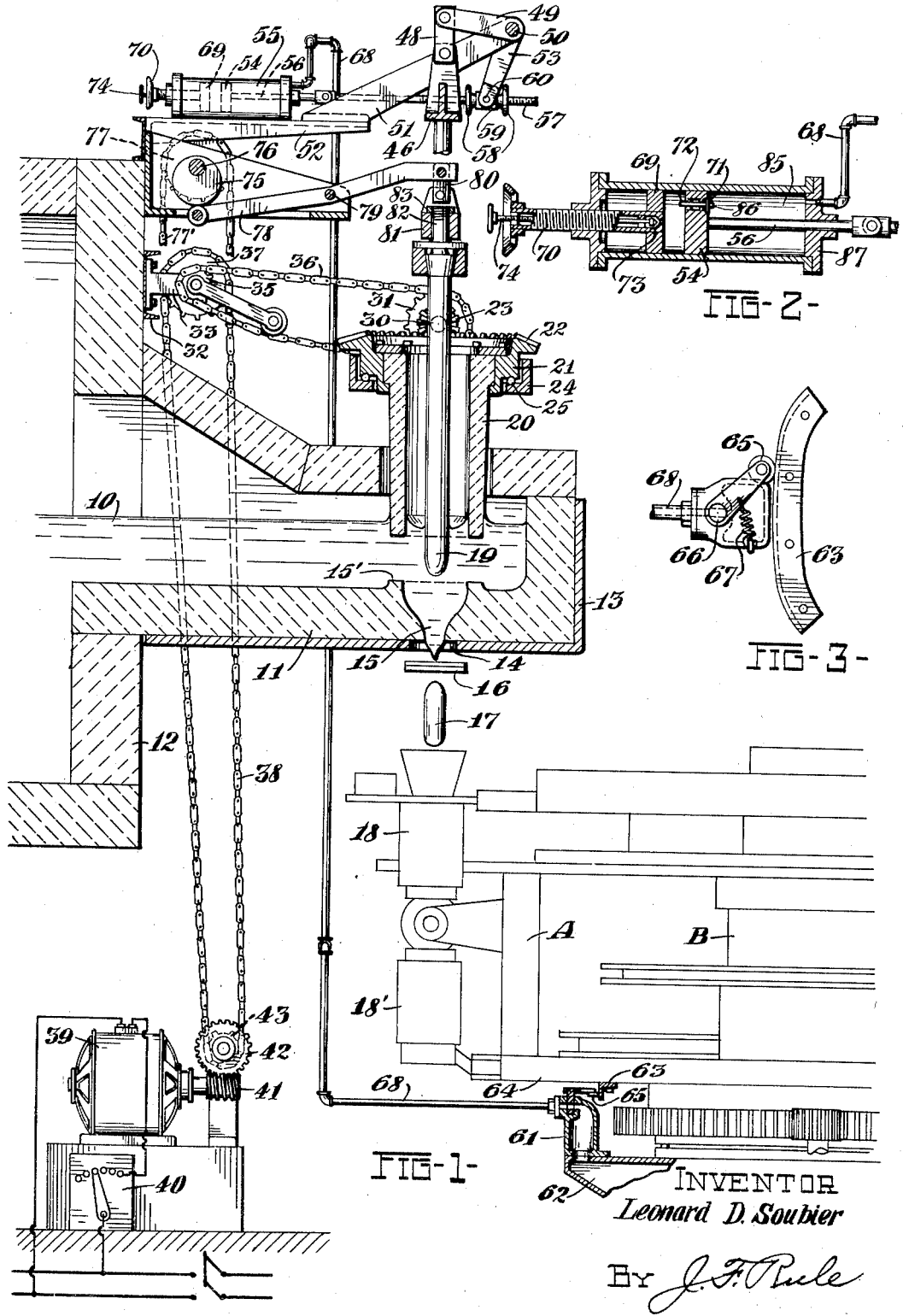

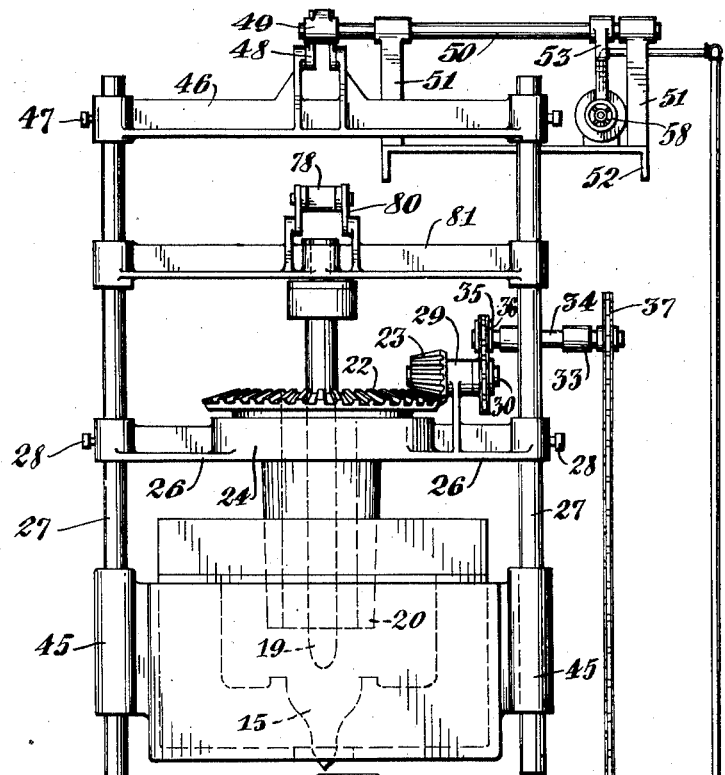
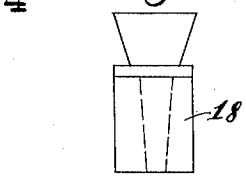
FIG-4-
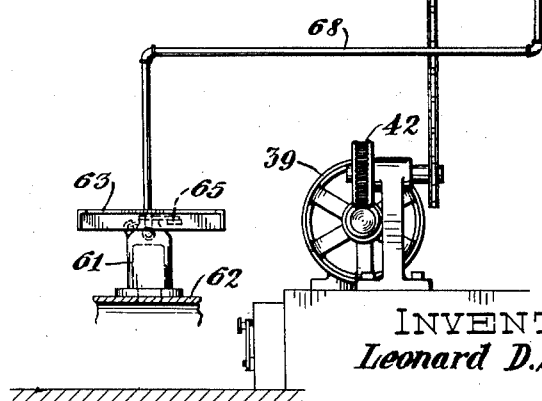
INVENTOR
*Leonard D. Soubier*
By *J. F. Rule,*
ATT'Y

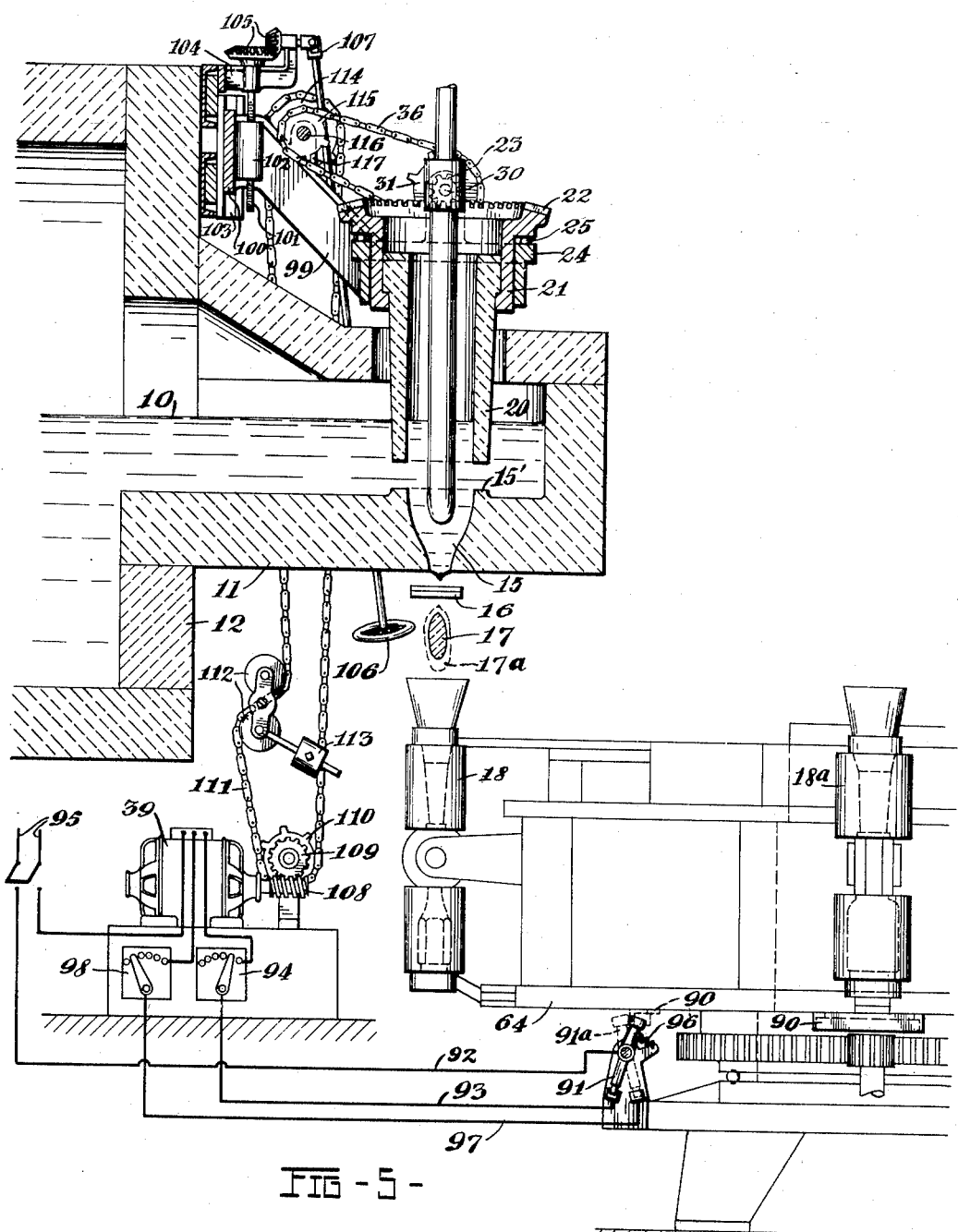
FIG-5-

Patented June 25, 1929.

1,718,608

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FEEDING APPARATUS.

Application filed April 12, 1926. Serial No. 101,271.

My invention relates to molten glass feeding mechanism and is herein disclosed as applied to a feeder of the class in which a plunger reciprocating vertically within the glass in a container, automatically controls the discharge of glass through an outlet orifice beneath the plunger. More particularly the invention relates to apparatus for periodically regulating the size and weight of charges of molten glass issuing through the outlet.

An object of my invention is to provide an improved feeder of the type indicated, in which a rotating sleeve, concentric with the plunger and the orifice, regulates or modifies the flow of glass to and through the outlet orifice, and in which a periodic control or variation of movement of the rotating sleeve is effected, whereby the size of the charges of glass issuing from the feeder outlet may be periodically varied.

Another object is to provide a means of adjusting the movements of the sleeve so that the size and weight of the charges of molten glass may be regulated to conform to the blank molds on the forming machine.

Other objects of the invention will appear hereinafter.

In the accompanying drawings:

Figure 1 is a sectional side elevation of feeder mechanism embodying the principles of my invention, and shows the rotating sleeve in position over the outlet orifice, and the means of operating it. A forming machine with blank mold in position to receive a charge of glass is also shown.

Figure 2 is a longitudinal section of the air cylinder and piston which operates the sleeve vertically.

Figure 3 is a detail of a valve and its actuating cam, which valve controls the operation of the air motor.

Figure 4 is a front elevation of the apparatus.

Figure 5 illustrates a modified construction of feeder mechanism whereby periodic variation in size of charges of molten glass is obtained by periodically varying the speed of rotation of the sleeve.

The present application discloses certain subject matter of the invention also disclosed in my patent No. 1,626,705, granted May 3, 1927, entitled "Glass feeder", and is a continuation thereof as to all subject matter disclosed in both said patent and the present application.

Molten glass 10 (Fig. 1) is continuously supplied to a container 11 which may be the usual clay boot or extension of a refining tank or furnace 12. The container 11 is supported by a metal frame 13 having a circular opening 14 near its forward end. In the clay boot or container 11 is an outlet orifice 15 having an upwardly receding wall which terminates in the lip 15' slightly higher than the floor of the boot. Cutters 16 are periodically operated automatically to sever the gob of glass 17 from the issuing stream just as a blank mold 18 approaches to receive its charge of glass. As herein shown, the blank mold 18 is mounted on one of the heads or units A of a well known type of forming machine, in which a mold table or carrier 64 is mounted for continuous rotation about a central column B.

After the charge of glass has been given an initial shaping in the blank mold, the latter is automatically opened to allow transfer of the bare parison from the blank mold 18 to the blowing mold 18'. As each head or unit with its blank mold passes beneath the outlet opening 15, a charge of molten glass is dropped thereinto.

In some cases it is desired to periodically vary the size of the charges of glass in a predetermined order of sequence, as for example, when it is desired to make different sized articles at the same time on the forming machine, or when the feeder is arranged to supply charges in alternation to a plurality of forming machines arranged side by side, one machine having molds requiring larger charges than another. The construction herein disclosed provides for supplying such varisized charges, as will appear more fully hereinafter.

Directly over the orifice 15 is mounted the actuating plunger 19 which impels the glass through the orifice. The clay sleeve 20 is mounted in an annular carriage 21 having gear teeth 22 which engage with a driving gear 23. An annular bearing plate 24 supports the rotating carriage 21, and has bearings 25 for ease of rotation of the carriage 21. The plate 24 has oppositely extended arms 26 (Fig. 4) by which the plate is mounted and vertically adjustable on rods 27 and secured in adjusted position by set screws 28.

On one of the extensions 26 is mounted a journal 29, for carrying a shaft 30. The gear 23 is keyed to one end of this shaft, and to the other end is keyed a sprocket wheel 31. On the furnace structure 32 is mounted a bearing block 33 which carries a shaft 34. This shaft has keyed to it a sprocket wheel 35 which drives a chain 36 running over the wheel 31. Another sprocket wheel 37 is keyed to the shaft 34 and is driven by a chain 38. An adjustable speed motor 39, controlled by a rheostat 40, has mounted on its shaft a worm 41, which drives a worm gear 42. Directly connected to the worm gear 42 is a sprocket 43 which drives the chain 38. By adjusting the rheostat 40, the speed of the motor can be varied to vary the speed of the rotating sleeve 20 in the feeder.

The vertical rods 27 are slidably mounted in guides 45 which are a part of the metal supporting frame 13. A cross beam 46 is locked to the rods 27 by means of set screws 47, and is connected by a link 48 to a rock arm 49 which is rigidly attached to a rock shaft 50. The rock shaft 50 is mounted in brackets 51 which are carried by a shelf 52 of the furnace structure.

Near the end of rock shaft 50 is secured a crank arm 53 which is actuated by a piston 54 in an air cylinder 55, through the piston rod 56 and the reach rod 57. The reach rod 57 is threaded to receive the nuts 58 which adjust the position of a slide block 59 on the rod 57. The block 59 is connected to the crank arm 53 by means of a stud 60 (Fig. 1).

On the base of the forming machine (Fig. 1) is a valve box 61 having communication with an air chamber 62 of the forming machine. On each unit of the rotating table 64 is mounted a cam track 63 which engages a roller 65 (Fig. 3) and opens a valve 66 against the tension of a spring 67, which normally holds the valve in a closed position. When the valve is open, air under pressure is conducted through a pipe 68 to the cylinder 55 of the air motor and moves the piston 54 until it is stopped by a false head 69. The head 69 is adjustable lengthwise of the cylinder by turning a hollow screw 70 (Fig. 2). The length of stroke of the piston is thereby adjustable to adjust the height to which the rotating sleeve 20 will be lifted.

In the piston 54 is a valve 71 (Fig. 2), having a projecting stem 72. As the piston reaches the end of its stroke, the valve stem 72 strikes the false head 69, allowing the air to flow from chamber 85 through the valve 71, releasing the air pressure against the piston. The cam 63 is arranged to release the valve 66 about the time the piston completes its stroke and thereby cut off the air supply to the motor. An escape valve 73 is located in the false end 69 and is regulated to restrict the outflow of air by means of a screw rod 74 inside the hollow screw 70. As the pressure in chamber 85 is released, the clay sleeve 20 falls by gravity and the piston 54 returns to its normal position. As the piston reaches its limit of movement in a "crank-end" direction, a protruding portion 86 of the valve 71 strikes the cylinder head 87 and the vlave 71 is closed.

The discharge of glass is periodically controlled, as before mentioned, by the plunger 19. Any suitable mechanism may be employed to operate the plunger. As herein shown, the movements of the plunger are effected by means of a cam 75 on a continuously rotating shaft 76, driven by sprocket 77 and chain 77', the latter preferably geared to the mold carriage, in the usual manner, so that the reciprocations of the plunger are synchronized with the movements of the molds to charge receiving position. The cam operates through a lever 78 which is fulcrumed near its center on a rock shaft 79. At the forward end of the lever is a link 80 which connects it to a yoke or cross beam 81, slidably mounted on the rods 27. The stem of the plunger is held to the yoke 81 by the flanged stud 82 and nut 83. Thus, the movements of the plunger are entirely independent of the rotating sleeve. While the uprights 27 serve as guides for the yoke 81, they also serve as lifting members for the sleeve unit, through the yoke 26, and are themselves held from horizontal movement by the guides 45 on the feeder frame.

Briefly, the operations are as follows:

The sleeve 20 is adjusted by means of the hand wheels 58, to permit a more or less restricted flow of molten glass to the outlet orifice 15. In this adjusted position, a relatively small charge of glass is permitted to issue from the orifice. When more than one size of ware is to be made on the forming machine, a cam 63 is mounted in association with each unit or head of the machine which carries a mold of large capacity. The cams operate as heretofore explained, to cause the piston motor to lift the sleeve 20 and thereby give an unrestricted flow of molten glass to the outlet orifice during the formation of the charge for each of said molds of large capacity. The cam 63 may be made of sufficient length to sustain the air pressure in the cylinder 55 until the piston 54 completes the greater part of its stroke, and as the cam disengages the roller 65, the valve 66 is closed automatically, the expansion of the air under pressure in the cylinder being relied upon to complete the stroke of the piston. This operation raises the sleeve 20 and permits a rapid flow of glass to the outlet orifice. If desired, the individual cams 63 may be made of different lengths so that they will cause the sleeve 20 to be held up corresponding lengths of time, whereby the size of each charge of glass will be determined by the length of the corresponding cam.

A modified form of my invention may be constructed as follows:

The usual furnace or refining tank 12 (Fig. 5) supplies molten glass 10 to the boot or extension 11 having an outlet orifice 15 with upwardly receding walls which terminate in the lip 15′. Cutters 16 are periodically operated automatically to sever the gobs or charges of glass 17, 17ª, from the issuing glass just as the blank molds 18, 18ª, approach to receive their respective charges of glass.

In this form, it is desired to periodically vary the speed of rotation of the sleeve 20 to periodically vary the size of the charge of glass. For this purpose, I mount a cam 90 at such point or points on the machine as will periodically operate to effect a change in the speed of the motor 39 to vary the speed of rotation of the sleeve 20. As illustrated in Fig. 5, a movable switch member 91 pivoted near its center, normally maintains a closed circuit through the conductors 92, 93, the rheostat 94, motor 39, and any suitable source of power 95. When operating at this normal condition, the sleeve 20 is rotating at a comparatively high speed and the molten glass in the container 11 will tend to cling to the lower part of the rapidly rotating sleeve thus restricting by centrifugal force the flow of glass to the outlet orifice 15, and permitting a comparatively small charge of glass 17 to issue from said outlet.

When it is desired to cause a larger charge of glass to issue from the feeder, in order that larger ware may be manufactured, the cam 90 is so placed on the machine and in relation to the head or unit employed to make the larger sized ware, that it will swing the switch member 91 against the tension of a spring 96, to the dotted line position 91ª at a desired time. This establishes a circuit through a conductor 97 and rheostat 98 to operate the motor 39 at a slower speed. The speed of rotation of the sleeve 20 is thus reduced and glass will flow more freely to the outlet and a larger gob or charge will issue from the outlet orifice.

The rheostats 94, 98 are adjustable manually to suit any desired condition, and the motor 39 will accelerate or decelerate depending upon the position of the cam 90 on the rotating table 64.

The clay sleeve 20 is mounted in an annular carriage 21 having gear teeth 22 which engage with a driving gear 23. An annular bearing plate 24 supports the carriage 21 and has bearings 25 for ease of rotation of the carriage 21. The bearing plate 24 has oppositely disposed arms 99 which extend upwardly and rearwardly to the vertical slide member 100. This latter member is slidable vertically in a guideway 103 mounted upon the furnace structure and is movably supported by a screw 101 having threaded engagement with a block 102 mounted near the center of the plate 100.

The sleeve 20 is adjustable vertically by means of the hand wheel 106 connected by a rod through the flexible point 107 to the miter gears 105 and screw 101, which are carried in fixed relation in the bracket 104.

The motor 39 has mounted on its shaft a worm 108 which meshes with a worm gear 109, and drives a sprocket 110. A chain 111 is driven by the sprocket 110, and a pair of pulleys 112 having a counterweight 113 are provided to maintain sufficient tension in the chain in order to compensate for vertical adjustment of the sleeve. The chain 111 drives pulleys 114, 115 mounted on a common shaft 116 and carried in bearing blocks 117 on the arms 99 of the carrying frame. The sleeve 20 is driven as before mentioned, by the gears 22, 23, having driving connection through shaft 30 with sprocket 31 and chain 36.

Modifications may be resorted to within the spirit and scope of my invention.

What I claim is:

1. The combination with a container for molten glass having a discharge outlet permitting gravity issue of glass, of means operating at predetermined time intervals for causing a periodic variation in the rate of discharge, and separate means operating automatically to effect a further periodic variation in the rate of discharge, said separate means operating in synchronism with but at different time intervals from those of said first mentioned means.

2. In glass feeding mechanism, the combination with a container for molten glass having a discharge outlet, of means operating periodically on the glass within the container to control the rate of discharge, a second means operating automatically periodically within the glass in the container to effect a periodic variation in the rate of glass discharge, the intervals between successive operations of said second means being a multiple of the time intervals between successive operations of the first mentioned means.

3. Apparatus for delivering charges of molten glass comprising a container for the glass having a discharge outlet, means operating periodically on the glass within the container to effect periodic variations in the rate of discharge, a retarding device within the glass operable to restrict the flow, and mechanism for operating said retarding device in synchronism with the operations of said means but at different time intervals, such that the volume of glass periodically discharged under the control of said means is periodically varied.

4. The combination of a container for molten glass having a bottom outlet, a plunger projecting into the glass over the outlet, means for periodically reciprocating the plunger toward and from the outlet, a retarding device by which the rate of flow to the outlet is restricted, and means operating automatically to periodically vary the retarding action of said device and thereby vary the volume of glass discharged under the influence of said plunger.

5. The combination of a container for molten glass having a bottom outlet, a flow regulating plunger projecting into the glass over the outlet, means for periodically reciprocating the plunger toward and from the outlet, and additional flow control means operating at time intervals, each of which is a multiple of the time interval between consecutive reciprocations of the plunger, to effect a periodic retardation of the flow of glass to the outlet, whereby the volumes of the charges delivered are periodically varied in a predetermined order of sequence.

6. The combination of a container for molten glass having a discharge outlet, a tubular member projecting into the glass over the outlet into position to restrict the flow, means to effect an actuation of said member at predetermined time intervals by which the extent of said restriction is modified, and means cooperating with said member and operating at different time intervals from said first-mentioned time intervals to apply a controlling force to the issuing glass, whereby the charges of glass delivered are periodically varied in a predetermined order.

7. The combination of a container for molten glass having a discharge outlet, a tubular member projecting into the glass over the outlet into position to restrict the flow, means to effect an actuation of said member at predetermined time intervals by which the extent of said restriction is modified, a plunger within said member, and means to periodically reciprocate the plunger in synchronism with the actuations of said member and at different time intervals therefrom, whereby the size of the charges of glass delivered is periodically varied.

8. The combination of a container for molten glass having a bottom outlet, two concentric implements projecting into the glass over the outlet, means to periodically actuate one implement at time intervals of predetermined length to effect a periodic variation in the rate of discharge of glass, and means to periodically actuate the other implement at time intervals of a different length from said first-mentioned time intervals.

9. The combination of a container for molten glass having a bottom outlet, a plunger projecting into the glass over the outlet, means for periodically reciprocating the plunger toward and from the outlet, a tube surrounding the plunger and projecting into the glass in position to restrict the flow of glass to the outlet, and means for periodically reciprocating the tube toward and from the outlet in synchronism with the reciprocations of the plunger, the time intervals between successive reciprocations of the plunger being different from the time intervals between successive reciprocations of the tube, and means operating automatically to periodically vary the position of the tube prior to and during predetermined glass discharging movements of the plunger.

10. The combination of a container for molten glass having a bottom outlet, a plunger projecting into the glass over the outlet, means for periodically reciprocating the plunger toward and from the outlet, a rotary tube surrounding the plunger and projecting into the glass in position to restrict the flow of glass to the outlet, means for periodically reciprocating the tube toward and from the outlet in synchronism with the reciprocations of the plunger, the time intervals between successive reciprocations of the plunger being different from the time intervals between successive reciprocations of the tube, means operating automatically to periodically vary the position of the tube prior to and during predetermined glass discharging movements of the plunger, and manual adjusting means for varying the speed of rotation of the tube.

11. The combination of a glass forming machine comprising a rotating mold carriage, molds thereon brought successively to charging position by the rotation of the carriage, means including a flow regulating plunger and tube surrounding the plunger, operating in synchronism with the movements of the carriage causing delivery of charges of glass to the molds, and means controlled by the movements of the carriage to periodically vary the elevation of the tube surrounding the plunger and thereby vary the volume of successive charges of glass.

12. The combination of a glass forming machine comprising a rotating mold carriage, molds thereon brought successively to a charge receiving position, glass feeding mechanism comprising a container having an outlet through which glass is discharged, a plunger, means for reciprocating the plunger in synchronism with the movements of the mold carriage to control the discharge, a tube surrounding the plunger and mechanism controlled by the movements of the mold carriage for periodically changing the elevation of the tube and thereby varying the rate of discharge.

Signed at Toledo, in the county of Lucas and State of Ohio, this 9th day of April, 1926.

LEONARD D. SOUBIER.